US012339463B2

(12) United States Patent
Bosch et al.

(10) Patent No.: US 12,339,463 B2
(45) Date of Patent: Jun. 24, 2025

(54) DEVICE WITH A REMOVABLE CUSHION

(71) Applicant: Apple Inc., Cupertino, CA (US)

(72) Inventors: Erin M Bosch, San Jose, CA (US); Paul X Wang, Cupertino, CA (US); Benjamin A Shaffer, San Jose, CA (US)

( * ) Notice: Subject to any disclaimer, the term of this patent is extended or adjusted under 35 U.S.C. 154(b) by 0 days.

(21) Appl. No.: 18/442,519

(22) Filed: Feb. 15, 2024

(65) Prior Publication Data

US 2024/0184121 A1 Jun. 6, 2024

Related U.S. Application Data

(63) Continuation of application No. PCT/US2022/041897, filed on Aug. 29, 2022.

(60) Provisional application No. 63/242,422, filed on Sep. 9, 2021.

(51) Int. Cl.
*G02B 27/01* (2006.01)

(52) U.S. Cl.
CPC ................................ *G02B 27/0176* (2013.01)

(58) Field of Classification Search
CPC ............ G02B 27/0176; G02B 27/0149; G02B 2027/0154; G02B 2027/0156
See application file for complete search history.

(56) References Cited

U.S. PATENT DOCUMENTS 9,176,325 B2 11/2015 Lyons
10,133,305 B1 * 11/2018 Sullivan ............. G02B 27/0176
10,838,203 B2 11/2020 Franklin et al.
11,019,872 B2 6/2021 Calilung et al.
11,204,504 B1 * 12/2021 Jacobs ............... G02B 27/0176
2009/0300828 A1 * 12/2009 Chiang ................ A63B 33/004 2/452
2017/0082859 A1 3/2017 Drinkwater et al.
2017/0153672 A1 6/2017 Shin et al.
2018/0095498 A1 4/2018 Raffle et al.
2018/0295733 A1 * 10/2018 Wen ....................... G02C 3/003
2019/0028697 A1 1/2019 Sullivan et al.
2019/0041899 A1 * 2/2019 Ellis .................. G02B 27/0176
2019/0243145 A1 8/2019 Ellis et al.
2020/0344901 A1 10/2020 Araki et al.
2021/0402122 A1 * 12/2021 Ng .................... A61M 16/0057

FOREIGN PATENT DOCUMENTS

CN 207181831 U 4/2018

* cited by examiner

*Primary Examiner* — Towfiq Elahi
(74) *Attorney, Agent, or Firm* — Treyz Law Group, P.C.; Joseph F. Guihan; Jinie M. Guihan

(57) ABSTRACT

A head-mounted device may have a head-mounted support structure that is configured to be worn on a head of a user. The head-mounted support structure may include a flexible rear portion that at least partially defines a central opening through which the displays in the head-mounted device are viewable. The flexible rear portion may conform to a face of the user when the head-mounted device is worn by the user. A removable cushion may be selectively attached to the flexible rear portion of the head-mounted support structure. The removable cushion may conform to and directly contact the face of the user when the head-mounted device is worn by the user. The removability of the cushion may allow for the cushion to be easily cleaned, easily replaced when worn, and customized to a user's aesthetic and comfort preferences.

19 Claims, 10 Drawing Sheets

DEVICE WITH A REMOVABLE CUSHION

This application is a continuation of international patent application No. PCT/US2022/041897, filed Aug. 29, 2022, which claims priority to U.S. provisional patent application No. 63/242,422, filed Sep. 9, 2021, which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

A head-mounted device may have a head-mounted support structure that is configured to be worn on a head of a user. While the head-mounted device is being worn, displays in the head-mounted device may provide images to eye boxes where the user's eyes are located. This allows the user to view the images.

The head-mounted support structure may include a rigid front portion, a flexible rear portion, and support posts that couple the rigid front portion to the flexible rear portion. The flexible rear portion may at least partially surround a central opening through which the displays in the head-mounted device are viewable. The flexible rear portion may be configured to conform to a face of the user when the head-mounted device is worn by the user.

A removable cushion may be selectively attached to the flexible rear portion of the head-mounted support structure. The removable cushion may be configured to conform to and directly contact the face of the user when the head-mounted device is worn by the user. The removability of the cushion may allow for the cushion to be easily cleaned, easily replaced when worn, and customized to a user's aesthetic and comfort preferences. The removable cushion may also have a thickness that optimizes eye relief in the system.

The removable cushion may have recesses that mate with corresponding protrusions on the flexible rear structure. Magnets may also be included in the removable cushion that magnetically couple to corresponding magnets in the head-mounted support structure. The removable cushion may have a hinge structure to enable greater portability.

DETAILED DESCRIPTION

A head-mounted device may include a head-mounted support structure that allows the device to be worn on the head of a user. The head-mounted device may have displays that are supported by the head-mounted support structure for presenting a user with visual content. The head-mounted device may also have sensors such as front-facing cameras and other sensors for gathering information on the environment surrounding the device.

The head-mounted device may include a removable cushion that is configured to be attached to the head-mounted support structure. The removable cushion may contact the user's face when the head-mounted device is worn by the user. There are many advantages to using a removable cushion of this type in the head-mounted device. Because the cushion contacts the user's face during operation, the cushion may tend to become dirty over time. If the cushion is not removable, it may be difficult to clean the cushion. However, the removable cushion is easy to remove from the head-mounted device to wash. The removable cushion is therefore easy to keep clean during repeated uses.

In addition to making the cushion easier to clean, the removability of the cushion makes the cushion easier to replace. If the cushion becomes worn down over time or damaged, the removable cushion may simply be replaced with a new removable cushion. This extends the lifetime of the head-mounted device.

The removable cushion may also be customizable. If the cushion is not removable, the properties of the cushion in the head-mounted device are fixed. With a removable cushion, an optimal removable cushion out of multiple options may be selected by a user. For example, the user may select a removable cushion with a desired color, softness, and dimensions. In this way, the user may select a custom removable cushion that is the most comfortable for them.

Figure 1:
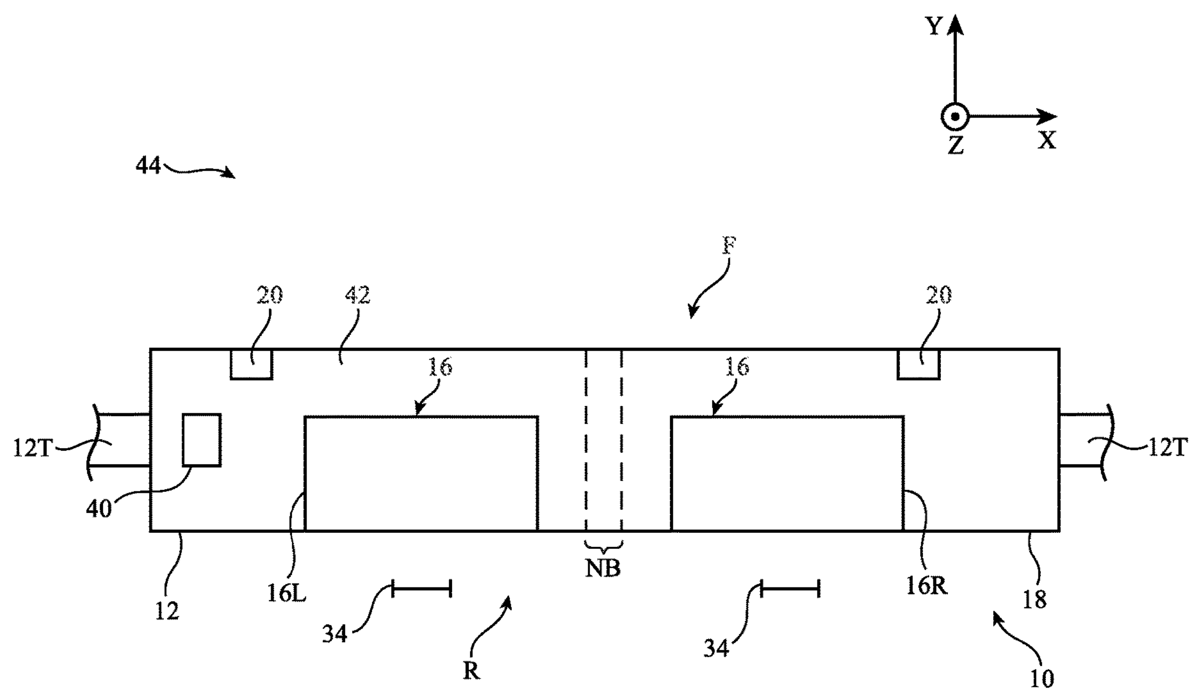
FIG. 1 is a top view of an illustrative electronic device such as a head-mounted device in accordance with an embodiment.

FIG. 1 is a top view of an illustrative head-mounted electronic device. As shown in FIG. 1, head-mounted device 10 may include housing 12. Housing 12 is configured to be worn on a user's head and may sometimes be referred to as a head-mounted housing or head-mounted support structure. Housing 12 may have curved head-shaped surfaces, a nose-bridge portion such as portion NB that is configured to rest on a user's nose when device 10 is on a user's head, may have a strap 12T for supporting device 10 on the user's head, and/or may have other features that allow device 10 to be worn by a user. Housing 12 may have walls or other structures that separate an interior region of device 10 such as interior region 42 from an exterior region surrounding device 10 such as exterior region 44. Electrical components 40 (e.g., integrated circuits, sensors, control circuitry, light-emitting diodes, lasers, and other light-emitting devices, other control circuits and input-output devices, etc.) may be mounted on printed circuits and/or other structures within device 10 (e.g., in interior region 42).

To present a user with images for viewing from eye boxes such as eye box 34, device 10 may include rear-facing displays in optical modules 16 (sometimes referred to as optical assemblies 16). There may be, for example, a left rear-facing display in left optical module 16L for presenting an image through a left lens to a user's left eye in a left eye box and a right rear-facing display in right optical module 16R for presenting an image through a right lens to a user's right eye in a right eye box.

The user's eyes are located in eye boxes 34 at rear side R of device 10 when inwardly facing surface 18 of housing 12 rests against the outer surface of the user's face. On rear side R, housing 12 may have cushioned structures (sometimes referred to as light seal structures) to enhance user comfort as surface 18 rests against the user's face.

Device 10 may have forward-facing components such has forward-facing cameras 20 on front side F that face outwardly away from the user. Cameras 20 may generally be oriented in the +Y direction of FIG. 1. If desired, the left-hand camera may face slightly to the left and the right-hand camera may face slightly to the right to enhance the overall coverage of cameras 20. During operation, images captured by cameras 20 (sometimes referred to as pass-through video and/or pass-through images) and/or computer-generated content such as text, graphics, etc. may be displayed for the user by displays in modules 16.

Figure 2:
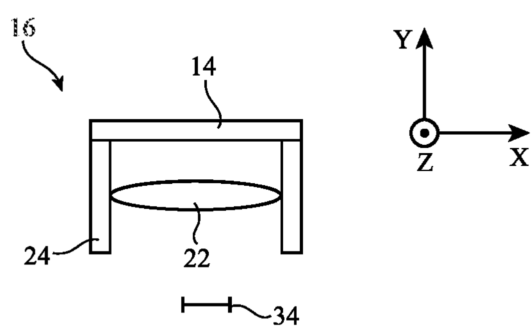
FIG. 2 is top view of an illustrative optical module for an electronic device in accordance with an embodiment.

FIG. 2 is a cross-sectional top view of an illustrative optical module. As shown in FIG. 2, optical module 16 may include display 14 and lens 22 mounted in optical module housing 24. Display 14 presents images in eye box 34.

Figure 3A:
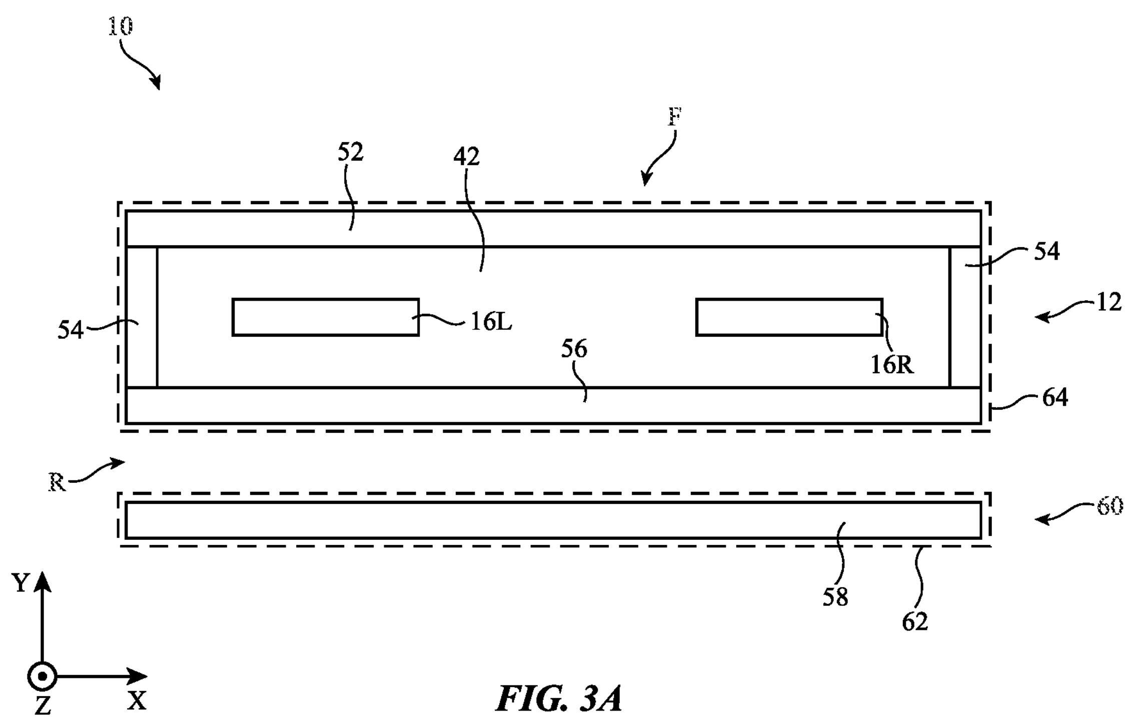
FIG. 3A is a cross-sectional top view of an illustrative head-mounted device with a removable cushion in an unattached state in accordance with an embodiment.

FIG. 3A is a cross-sectional top view of an illustrative head-mounted device with a removable cushion in its unattached (removed) state. As shown in FIG. 3A, head-mounted support structure 12 may include a rigid front structure 52 (sometimes referred to as front portion 52, rigid structure 52, etc.) at the front side F of the head-mounted device. Head-mounted support structure 12 additionally includes support posts 54 (sometimes referred to as rigid support posts 54, rigid sidewall portions 54, side portions 54, sidewall portions 54, support structures 54, etc.). The support structures 54 extend from the front portion 52 towards the rear side R. The support structures 54 may couple the front portion 52 to a flexible rear portion 56 (sometimes referred to as flexible structure 56, flexible ring 56, flexible light seal structure 56, etc.) of the head-mounted support structure. Interior 42 (with associated optical modules 16L/16R and other electronic components) is formed in the volume between front structure 52 and rear structure 56.

In one possible arrangement, a sidewall extending from front structure 52 in the negative Y-direction may be formed continuously around the perimeter of the front structure 52. Alternatively, to minimize the weight of the head-mounted support structure, discrete support posts 54 may be dispersed around the perimeter of the front structure 52. The support posts are each coupled between the rigid front structure 52 and the flexible rear structure 56. Air-filled gaps (or gaps filled with another desired light filler material) may separate adjacent support posts.

Front structure 52 may be an opaque structure that extends across the entire front side of device 10. Alternatively, front structure 52 may be a ring-shaped structure that extends in a ring around the front side of device 10. Flexible rear structure 56 may be a ring-shaped structure that extends in a ring around some or all of the rear side of device 10. Flexible rear structure 56 may be ring-shaped (with a central opening) to allow the user to view optical modules 16 while device 10 is worn by the user.

Head-mounted support structure 12 may optionally be covered on one or more sides by a textile layer 64 (sometimes referred to as fabric layer 64). Textile layer 64 may be formed from an opaque or light-shielding material (e.g., black yarn) or may formed from an underlying material coated with an opaque or light-shielding material (e.g., black dye or ink). The textile layer 64 may be formed by a woven fabric or a nonwoven fabric. As examples, the textile layer 64 may be formed from any suitable type of fabric such as knit fabric, woven fabric, braided fabric, etc.

In addition to head-mounted support structure 12, the head-mounted device includes a removable cushion 60 (sometimes referred to as a removable cushion member, removable foam, removable foam member, cushion, foam, etc.). Removable cushion 60 includes a cushion member 58 (sometimes referred to as cushion 58, cushion structure 58, foam member 58, foam structure 58, foam 58, etc.) that is optionally covered by a textile layer 62. Cushion member 58 may be formed from foam or another desired compressible material. Textile layer 62 may be formed from an opaque or light-shielding material (e.g., black yarn) or may formed from an underlying material coated with an opaque or light-shielding material (e.g., black dye or ink). The textile layer 62 may be formed by a woven fabric or a nonwoven fabric. As examples, the textile layer 62 may be formed from any suitable type of fabric such as knit fabric, woven fabric, braided fabric, etc.

Figure 3B:
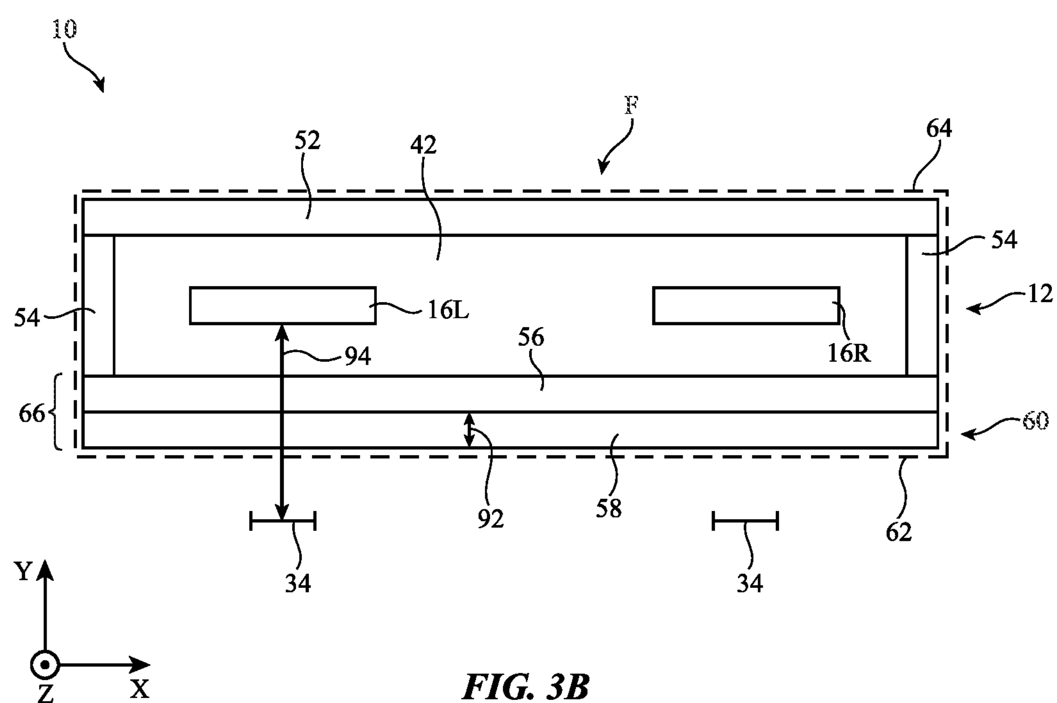
FIG. 3B is a cross-sectional top view of an illustrative head-mounted device with a removable cushion in an attached state in accordance with an embodiment.

The removable cushion may be attached to flexible structure 56 of head-mounted support structure 12. FIG. 3B is a cross-sectional top view of an illustrative head-mounted device with a removable cushion attached to an associated head-mounted support structure. As shown, when attached, the removable cushion 60 may be adjacent to flexible rear structure 56. Flexible structure 56 and removable cushion 60 may combine to form light seal structures 66 for the head-mounted device. Flexible structure 56 may therefore sometimes be referred to as a light seal structure, flexible light seal structure, non-removable light seal structure, etc. Removable cushion 60 may sometimes be referred to as a light seal structure, cushioning light seal structure, removable light seal structure, etc.

When head-mounted device 10 is worn on the head of a user, the light seal structures may conform to the user's face. To provide an immersive experience to the viewer and preserve high contrast in the display viewed by the user during operation, it may be desirable to block ambient light from reaching the user's eyes. This ensures the only light viewed by the user is from the display in the head-mounted device. Light seal structures 66 may be sufficiently flexible and/or compressible to conform to a user's face during operation, preventing stray light from entering the head-mounted device.

Flexible light seal structure 56 may be formed from a flexible plastic structure. The flexible plastic structure may be sufficiently flexible to conform to the shape of a user's face when worn by the user. However, the flexible plastic structure may have sufficient rigidity to hold its shape while being worn (e.g., and does not bias towards or away from the user's face while being worn). Flexible light seal structure 56 may not be compressible (e.g., may be less compressible than cushion 60). Removable cushion 60 may also be sufficiently flexible to conform to the shape of a user's face when worn by the user. Cushion 60 may be compressible. The compressible cushion may be pressed against the user's face to form a tight light seal while still remaining comfortable for the user.

There are many advantages to using a removable cushion as shown in FIGS. 3A and 3B in the head-mounted device (as opposed to a permanently fixed cushion). Because the cushion contacts the user's face during operation, the cushion may tend to become dirty over time. If the cushion is not removable, it may be difficult to clean the cushion. However, the removable cushion is easy to remove from the head-mounted device to wash. The removable cushion therefore is easy to keep clean during repeated uses. The removable cushion may be formed using materials that will not be damaged by water to promote easy cleaning. The removable cushion may be formed using materials that dry quickly so that the removable cushion is ready for use quickly after cleaning.

In addition to making the cushion easier to clean, the removability of the cushion makes the cushion easier to replace. If the cushion becomes worn down over time or damaged, the removable cushion may simply be replaced with a new removable cushion. This extends the lifetime of the head-mounted device.

The removable cushion may also be customizable. If the cushion is not removable, the properties of the cushion in the head-mounted device are fixed. With a removable cushion, an optimal removable cushion out of multiple options may be selected by a user. For example, the user may select a removable cushion with a desired color and/or dimensions. In this way, the user may select a custom removable cushion that is the most comfortable for them.

There are numerous dimensions of the removable cushion that may be customized for different users. One such dimension is the cushion's thickness 92 (e.g., the dimension parallel to the Y-direction) as shown in FIG. 3B. Some user's may prefer a thicker cushion for maximum comfort whereas other user's may prefer a thinner cushion for maximum comfort.

The cushion thickness may also impact the eye relief of the optical system. The eye relief is defined as the distance 94 between an optical module and a respective eye box that views that optical module. The thickness 92 of the removable cushion therefore influences the eye relief distance 94. A thicker removable cushion will result in a larger associated eye relief distance whereas a thinner removable cushion will result in a smaller associated eye relief distance.

In some cases, depending on the characteristics of a user's eye (e.g., a user's glasses prescription), a specific eye relief may be preferable. For example, a first user may not require glasses. For the first user, a first eye relief distance may be optimal. A second user may have a glasses prescription. The optical module may be customized for the user's glasses prescription (e.g., by adding removable lenses to the optical module). In this scenario, for the second user, a second eye relief distance that is different than the first eye relief distance may be optimal. In this situation, the first user may use a first removable cushion having a first thickness (that produces the first eye relief distance) whereas the second user may use a second removable cushion having a second thickness that is different than the first thickness (and that produces the second eye relief distance).

Thickness 92 may be any desired magnitude (e.g., between 1.5 millimeters and 2.5 millimeters, between 2.5 millimeters and 3.5 millimeters, between 3.5 millimeters and 4.5 millimeters, between 1 millimeter and 5 millimeters, between 1 millimeter and 10 millimeters, etc.).

The removable cushion selected by a user may therefore have a thickness 92 that is optimized for their comfort and/or optimizes eye relief distance for the system.

Instead of (or in addition to) customizing the thickness (or other dimensions) of the removable cushion, a user may customize the material of the removable cushion. For example, some users may prefer a softer foam in the removable cushion whereas other users may prefer a harder foam in the removable cushion. Different options for the removable cushions may therefore have the same dimensions but be formed from different materials.

Figure 4:
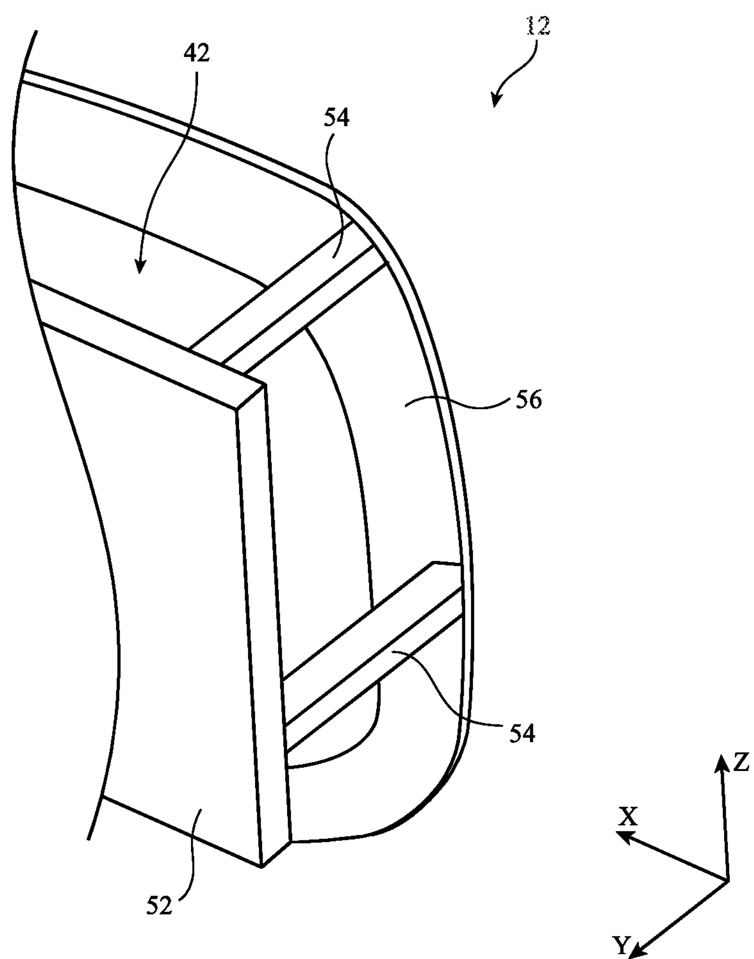
FIG. 4 is a perspective view of an illustrative head-mounted support structure in accordance with an embodiment.

FIG. 4 is a perspective view of head-mounted support structure 12 (without the removable cushion 60). As shown, front structure 52 covers the entire front side of the head-mounted device (e.g., front structure 52 does not have a central opening). In contrast, flexible rear structure 56 is ring-shaped with a central opening (e.g., the flexible rear structure 56 defines a central opening). The user may view optical modules 16 through the central opening while using the head-mounted device. As shown in FIG. 4, support posts 54 connect the flexible rear structure 56 to rigid front structure 52. Interior volume 42 (with associated optical modules 16 and other electronic components) is formed between front structure 52 and rear structure 56. Any desired number of support structures may be included in the device. The support structures may be distributed around the periphery of the device to ensure that the central opening with optical modules 16 is not blocked.

Each support structure may optionally be attached to the flexible structure 56 using a pivoting portion with a spherical joint. The spherical joint may allow for the flexible structure 56 to be pressed against the user's face at any desired angle, allowing the flexible structure 56 to conform to the user's face as much as possible (promoting a tight light seal).

It should be noted that head-mounted support structure 12 in FIG. 4 may also be covered by textile layer 64, similar to as shown and discussed in connection with FIG. 3A. The textile layer is omitted from FIG. 4 so as to not obfuscate the drawing.

Figure 5A:
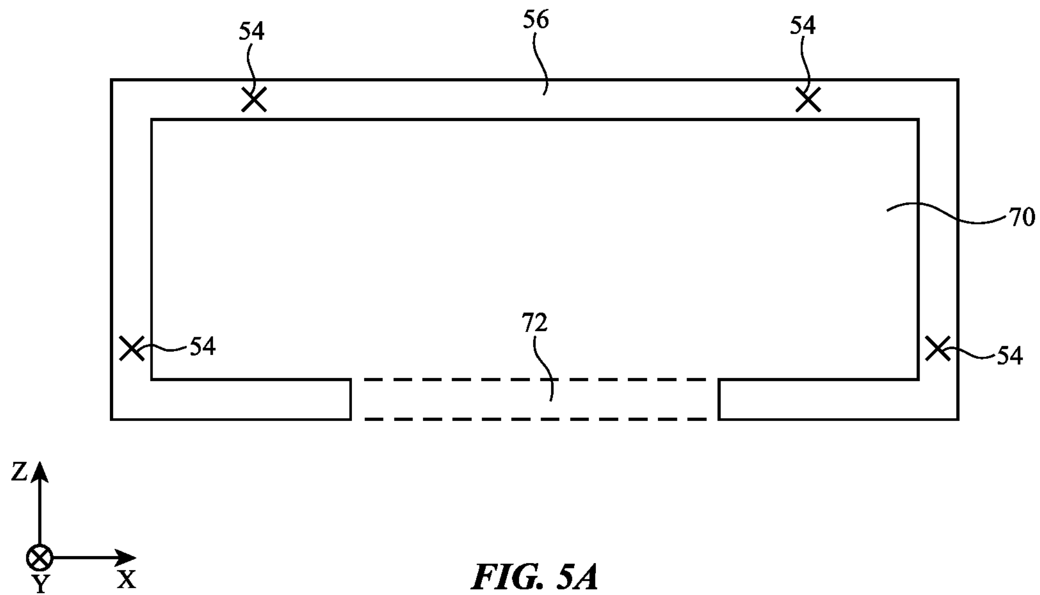
FIG. 5A is a rear view of an illustrative flexible structure that is part of a head-mounted support structure and that is attached to various support posts in accordance with an embodiment.

FIG. 5A is a rear view of flexible structure 56. As shown, flexible structure 56 may have a ring-shape that extends partially or completely in a ring around a central opening 70. The flexible structure 56 may have a gap along the lower edge to accommodate the nose of the user during operation. If desired, an optional nasal-region-mounted structure 72 that is configured to rest on the nose of a user may bridge the gap between the first and second ends of the flexible structure. Structure 72 may conform to the facial topology of the user around the nasal region and block light from entering the head-mounted device during operation. Alternatively, nasal-region-mounted structure 72 may be omitted and flexible structure 56 may form a complete ring around the central opening such that a portion of the flexible structure 56 rests on the nose of the user during operation of the head-mounted device.

The flexible structure 56 be attached to support posts 54 at various points around the flexible structure. FIG. 5A shows an example where four support posts 54 are coupled to the flexible structure. As previously mentioned, each support post may be coupled to the flexible structure with a spherical joint to accommodate the different curvatures of different users' faces.

Figure 5B:
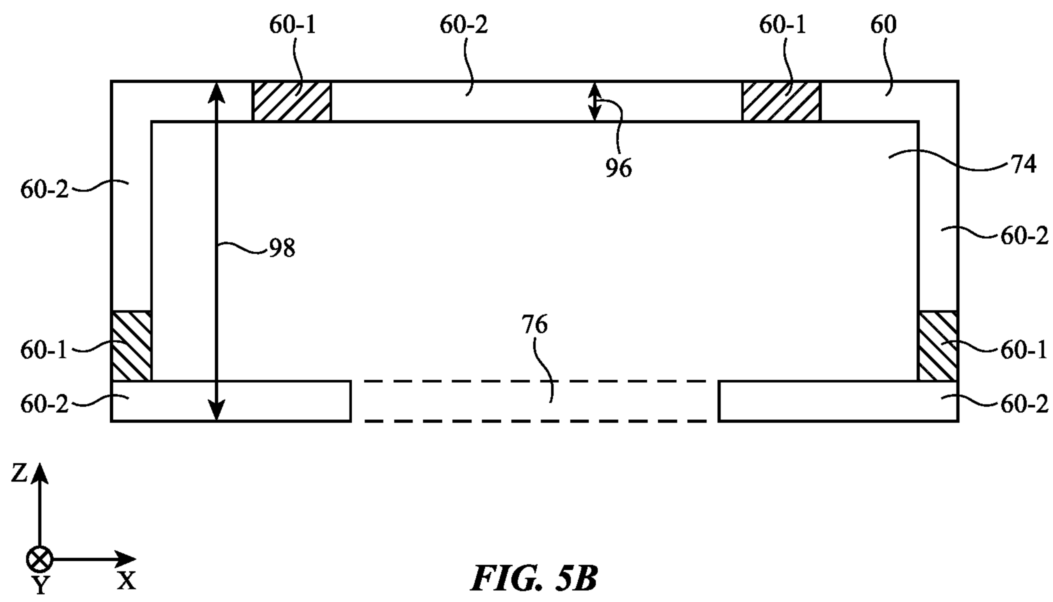
FIG. 5B is a rear view of an illustrative removable cushion that has high-rigidity portions that are configured to overlap the locations of support posts in a corresponding head-mounted support structure in accordance with an embodiment.

FIG. 5B is a rear view of removable cushion 60. As shown, removable cushion 60 may have a ring-shape that extends partially or completely in a ring around a central opening 74. The cushion 60 may have a gap along the lower edge to accommodate the nose of the user during operation. If desired, an optional nasal-region-mounted structure 76 that is configured to rest on the nose of a user may bridge the gap between the first and second ends of the removable cushion. Structure 76 may conform to the facial topology of the user around the nasal region and block light from entering the head-mounted device during operation. Alternatively, nasal-region-mounted structure 76 may be omitted and cushion 60 may form a complete ring around the central opening such that a portion of the cushion 60 rests on the nose of the user during operation of the head-mounted device.

Although it is generally desirable for cushion 60 to be compressible (for user comfort and a tight light seal), cushion 60 may include one or more high-rigidity portions 60-1. The high-rigidity portions 60-1 may provide sufficient structural integrity to prevent cushion 60 from being totally compressed. This may, for example, prevent a user's face from striking internal electronic components of the head-mounted device and/or flexible structure 56 during an impact event. High-rigidity portions 60-1 are distributed across cushion 60. Low-rigidity portions 60-2 are interposed in the remaining areas of the cushion (e.g., between each adjacent pair of high-rigidity portions).

The high-rigidity portions 60-1 have a greater rigidity and a lower compressibility than low-rigidity portions 60-2. The high-rigidity portions 60-1 may be formed from a different material than low-rigidity portions 60-2. In other words, cushion structure 58 (see FIGS. 3A and 3B) includes high-rigidity portions 60-1 formed from a first material and low-rigidity portions 60-2 formed from a second material that is different than the first material. As another example, the entire cushion structure 58 may be formed from the same base material. However, high-rigidity portions 60-1 may include an additive (e.g., a second material) that increases rigidity relative to low-rigidity portions 60-2.

As shown in FIG. 5B, the cushion 60 may have approximately the same footprint as flexible rear structure 56 from FIG. 5A (when viewed from the rear). Additionally, high-rigidity portions 60-1 may be positioned to overlap support posts 54 (in the Y-direction) when the removable cushion 60 is attached to flexible rear structure 56. In other words, each high-rigidity portion 60-1 is aligned (in the Y-direction) with a respective portion of flexible structure 56 that is attached to a support post. Each high-rigidity portion 60-1 is therefore aligned (in the Y-direction) with a respective support post. This type of arrangement may ensure that the high-rigidity portions 60-1 provide the target structural integrity for cushion 60 while minimizing detectability to the user. The presence of support posts 54 make flexible structure 56 more rigid in these locations. Therefore, positioning high-rigidity portions 60-1 in the same location consolidates the high-rigidity portions.

FIG. 5B shows another dimension 96 of the removable cushion that may be customized. Dimension 96 may be referred to as the height (e.g., in the Z-direction) of the cushion along an upper edge of the cushion. The upper edge of the cushion may be adjacent to the user's forehead during use and may therefore sometimes be referred to as a forehead portion of the cushion. Some user's may prefer a larger upper-edge height 96 than others for maximum comfort. A user may therefore select a removable cushion 60 that has an optimal upper-hedge height 96 for their needs. Height 96 may be greater than 3 millimeters, greater than 5 millimeters, greater than 10 millimeters, greater than 15 millimeters, greater than 20 millimeters, greater than 30 millimeters, greater than 50 millimeters, less than 3 millimeters, less than 5 millimeters, less than 10 millimeters, less than 15 millimeters, less than 20 millimeters, less than 30 millimeters, less than 50 millimeters, between 5 millimeters and 30 millimeters, etc.

Dimension 98 (as shown in FIG. 5B) may also be customized. Dimension 98 may be referred to as the total height (e.g., in the Z-direction) of the cushion. The total height may influence factors such as the separation between the upper edge of the cushion and a user's eyebrow. Some user's may prefer greater separation between the upper edge of the cushion and the user's eyebrow than others for maximum comfort. A user may therefore select a removable cushion 60 that has an optimal height 98 for their needs. Height 96 may be greater than 5 centimeters, greater than 8 centimeters, greater than 10 centimeters, greater than 15 centimeters, greater than 20 centimeters, less than 8 centimeters, less than 10 centimeters, less than 15 centimeters, less than 20 centimeters, between 5 centimeters and 15 centimeters, etc.

Figure 6A:
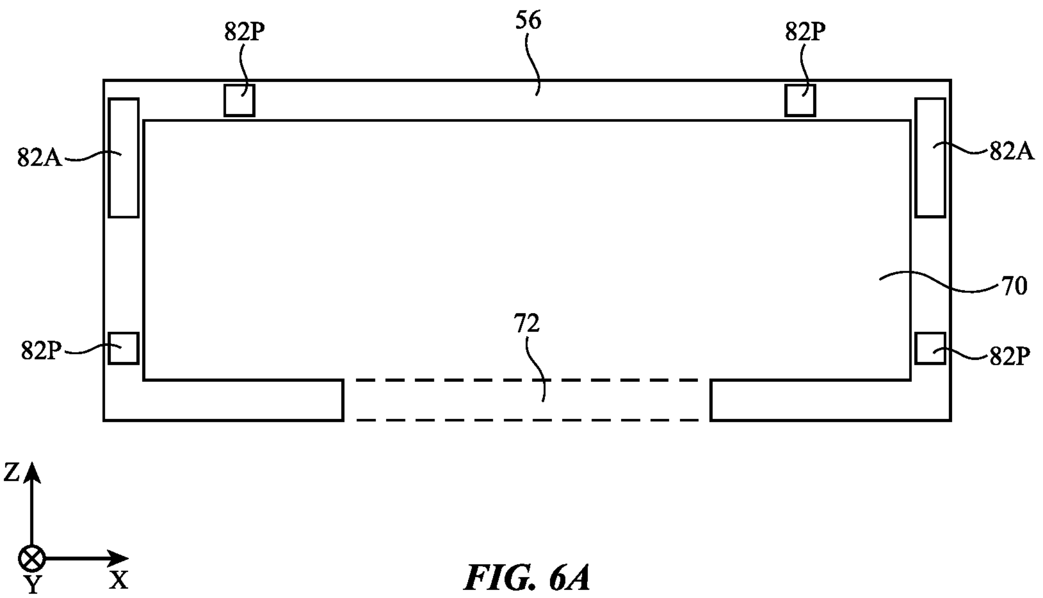
FIG. 6A is a rear view of an illustrative flexible structure that has primary attachment structures and auxiliary attachment structures in accordance with an embodiment.
Figure 6B:
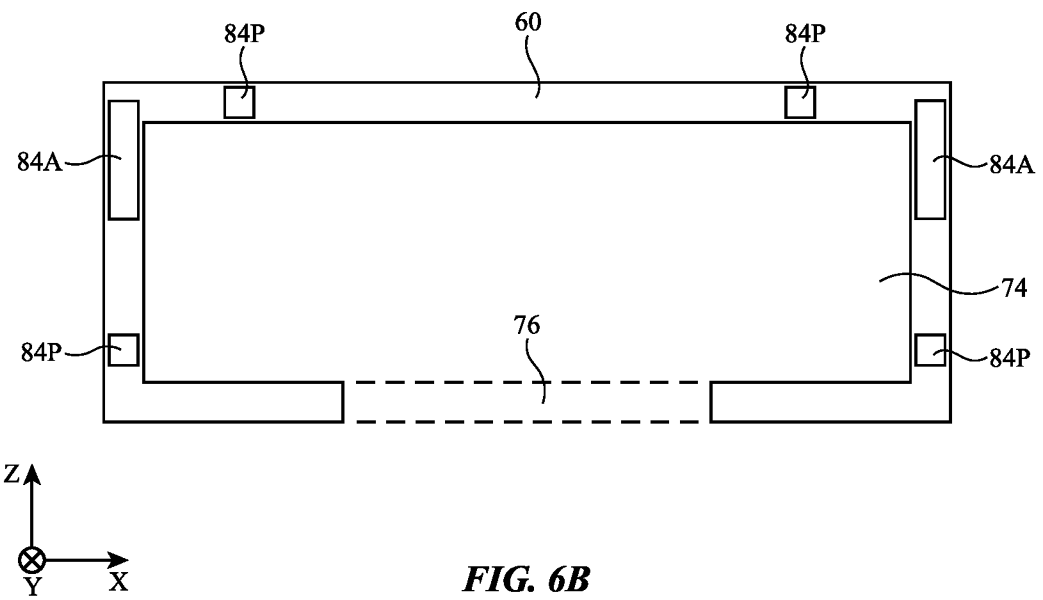
FIG. 6B is a rear view of an illustrative removable cushion that has primary attachment structures and auxiliary attachment structures in accordance with an embodiment.

Head-mounted support structure 12 and/or removable cushion 60 may include attachment structures that are used to secure removable cushion 60 to the head-mounted support structure. FIG. 6A is a rear view of flexible rear structure 56 (of head-mounted support structure 12) showing how the flexible rear structure may include one or more primary attachment structures 82P and, optionally, one or more auxiliary attachment structures 82A. FIG. 6B is a rear view of removable cushion 60 showing how the removable cushion may include one or more primary attachment structures 84P and, optionally, one or more auxiliary attachment structures 84A.

Each primary attachment structure 82P in flexible rear structure 56 may be configured to attach to a corresponding primary attachment structure 84P in removable cushion 60. Similarly, each auxiliary attachment structure 82A in flexible rear structure 56 may be configured to attach to a corresponding auxiliary attachment structure 84A in removable cushion 60. As shown in FIG. 6A, each primary attachment structure 82P in flexible rear structure 56 may align in the Y-direction with a corresponding primary attachment structure 84P in removable cushion 60 and each auxiliary attachment structure 82A in flexible rear structure 56 may align in the Y-direction with a corresponding auxiliary attachment structure 84A in removable cushion 60.

A wide range of attachment structures may be used for attachment structures 82P, 84P, 82A, and 84A. The attachment structures may include protrusions, recesses, grooves, posts, magnets, flexible fabric, hooks, loops, snaps, buttons, suction cups, a draw string, a zipper, adhesive (e.g., tape), a flexible band, or any other desired type of attachment structure.

As some specific examples of possible attachment structures, primary attachment structures 82P on flexible structure 56 may be protrusions that are configured to mate (interlock) with corresponding recesses (84P) on cushion 60. Primary attachment structures 82P on flexible structure 56 may be magnets (e.g., permanent magnets) that are configured to magnetically couple with corresponding magnets (84P) on cushion 60. Primary attachment structures 82P and 84P may form hook-and-loop fasteners (e.g., with hooks on structures 56 and loops on cushion 60 or vice versa). Primary attachment structures 82P and 84P may form snap fasteners. The first halves of the snaps may be formed on structures 56 and may have recesses and the second halves of the snaps may be formed on cushion 60 and may have protrusions with grooves that snap into place when pressed into the recesses (or vice versa). As yet another example, primary attachment structures 82P on flexible structure 56 may be grooves that are configured to mate (interlock) with corresponding posts (84P) on cushion 60. As yet another example, primary attachment structures 82P on flexible structure 56 may be posts. Cushion 60 may have a layer (ring) of flexible fabric that is configured to be stretched around the posts. As yet another example, rear flexible structure 56 may include an attached fabric channel. The removable cushion is then placed in the fabric channel during operation.

The specific example of a locations for primary attachment structures 82P and 84P in FIGS. 6A and 6B are merely illustrative. In general, primary attachment structures may be included at any desired locations.

The primary attachment structures may be the primary mechanism by which the removable cushion is secured onto the head-mounted support structure. However, in order to provide additional attachment strength and/or to ensure a tight light seal, auxiliary attachment structures 82A and 84A may also be included. As shown in FIG. 6B, auxiliary attachment structures 82A and 84A may be included along the left and right edges of the rear flexible structure and removable cushion. The rear flexible structure and removable cushion may commonly have high degrees of curvature in these areas when the head-mounted device is in operation (due to the curvature of the user's face). These high degrees of curvature may make the cushion and rear flexible structure susceptible to light leakage (e.g., through a gap between the cushion and rear flexible structure when the cushion and rear flexible structure are bent to conform to the user's face). The auxiliary attachment structures 82A and 84A in these high-risk areas may ensure a tight seal around the entire perimeter of the removable cushion and the rear flexible structure. The specific example of a locations for auxiliary attachment structures 82A and 84A in FIGS. 6A and 6B are merely illustrative. In general, auxiliary attachment structures may be included at any desired locations (e.g., adjacent/between any desired primary attachment structures).

Auxiliary attachment structures 82A and 84A may form hook-and-loop fasteners (e.g., with hooks on structures 56 and loops on cushion 60 or vice versa). Auxiliary attachment structures 82A and 84A may alternatively form snap fasteners. The first halves of the snaps may be formed on structures 56 and may have recesses and the second halves of the snaps may be formed on cushion 60 and may have protrusions with grooves that snap into place when pressed into the recesses (or vice versa). In general, any of the aforementioned attachment structures may be used for the auxiliary attachment structures.

Figure 7:
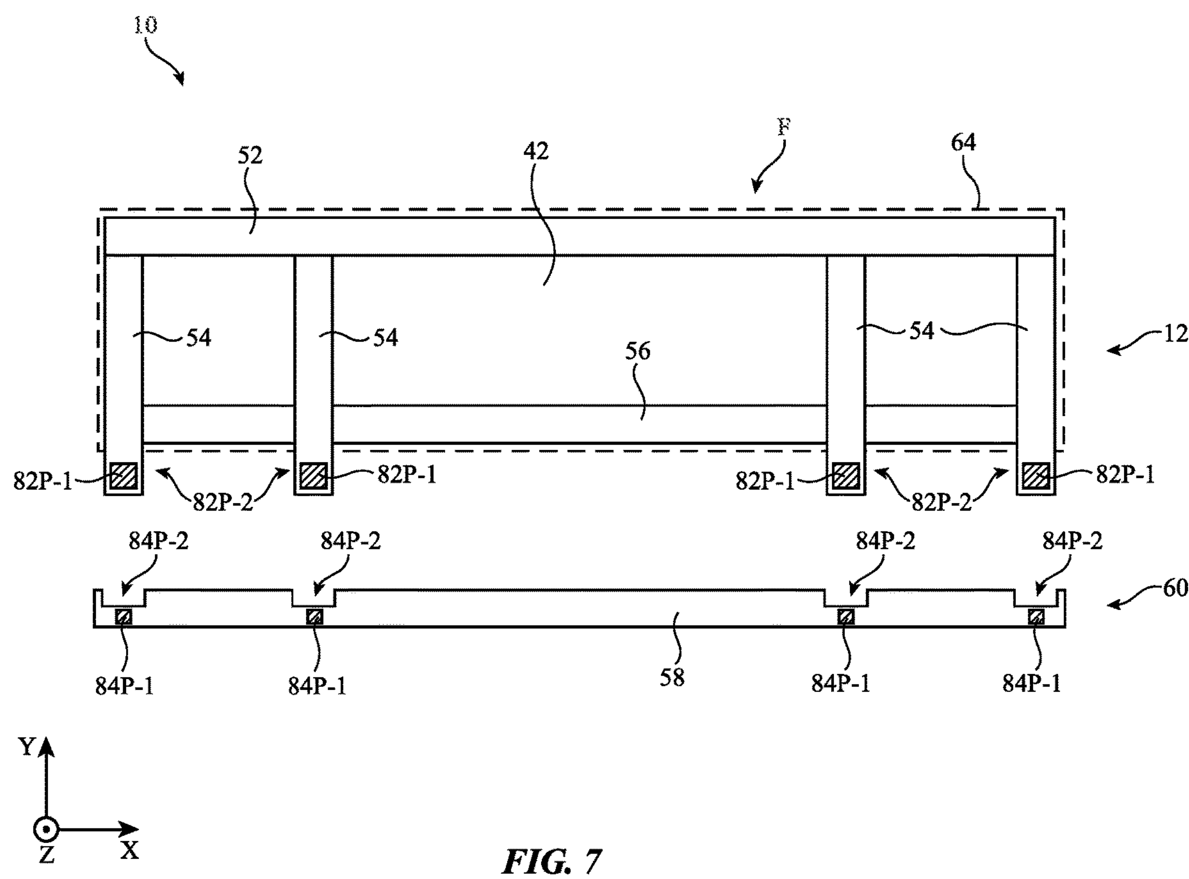
FIG. 7 is a cross-sectional top view of an illustrative head-mounted device with a removable cushion that has magnets and recesses in accordance with an embodiment.

If desired, multiple types of attachment structures may be used at each attachment point to ensure a secure attachment between the removable cushion 60 and the head-mounted support structure 12. FIG. 7 is a cross-sectional top view of an illustrative head-mounted device showing how protrusions, recesses, and magnets may be used to secure the removable cushion 60 to head-mounted support structure 12. As shown in FIG. 7, protrusions 82P-2 extend from flexible rear structure 56 in the negative Y-direction (e.g., towards the removable cushion). Removable cushion 60 has corresponding recesses 84P-2. Each recess 84P-2 may mate with a corresponding protrusion 82P-2.

In addition to the protrusions and recesses, magnets are also used as attachment structures for the head-mounted device. As shown in FIG. 7, magnets 82P-1 may be embedded in protrusions 82P-2. A single magnet may be embedded in each protrusion or multiple magnets may be embedded in each protrusion. A corresponding magnet 84P-1 may be formed in cushion structure 58 adjacent to each respective recess 84P-2. When removable structure 60 is attached to the head-mounted support structure, protrusions 82P-2 extend into and mate with recesses 84P-2. When the protrusions 82P-2 and recesses 84P-2 are mated, magnets 82P-1 will also be magnetically coupled to magnets 84P-1. This provides additional security for the removable cushion attachment and prevents gravity from causing the removable cushion to fall off of the head-mounted support structure.

The example of FIG. 7 is merely illustrative. In addition to the primary attachment structures of protrusions, recesses, and magnets, auxiliary attachment structures such as snaps or hook-and-loop fasteners may also be included to secure the removable cushion to head-mounted support structure 12 and ensure a tight light seal.

In some embodiments, protrusions 82P-2 may be formed integrally with rear flexible structure 56 or may be formed from a separate material that is attached to rear flexible structure 56. Alternatively, in the arrangement of FIG. 7, the protrusions 82P-2 are formed integrally with support posts 54. In other words, portions of support posts 54 extend through openings in rear flexible structure 56 to form attachment structures 82P-2. The support posts 54 may also extend through openings in textile layer 64 (which covers head-mounted support structure 12). In this away, the support post protrusions 82P-2 serve as a visual indicator to a user that the head-mounted support structure is not yet attached to a removable cushion. The support post protrusions 82P-2 also provide recognizable alignment markers that allow the user to easily align and attach the removable cushion to the head-mounted support structure.

Figure 8:
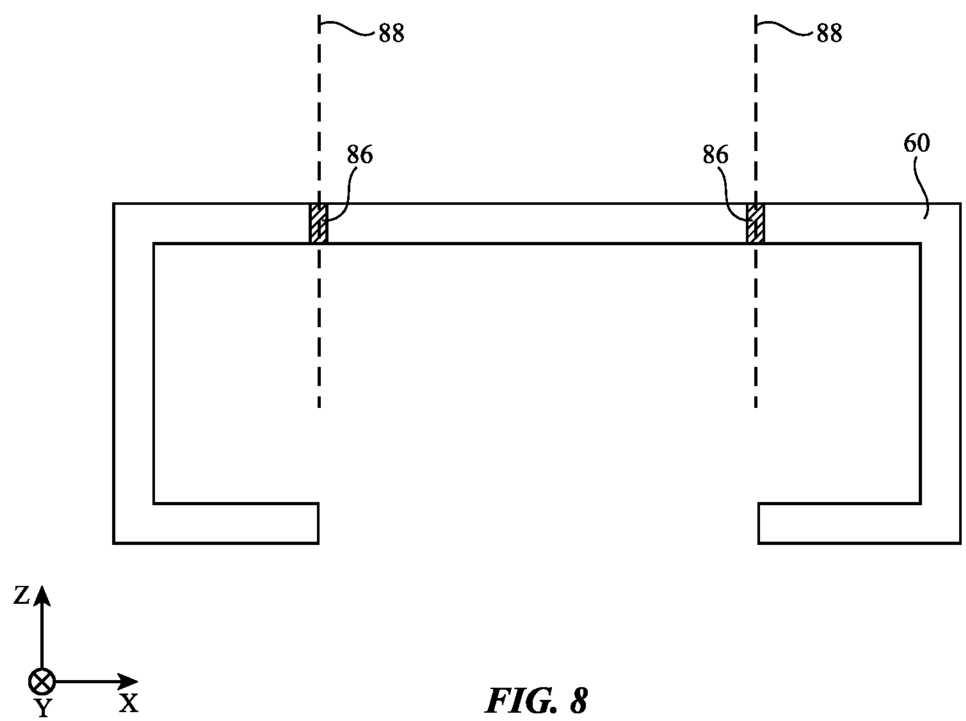
FIG. 8 is a rear view of an illustrative removable cushion that has hinge structures in accordance with an embodiment.

FIG. 8 is a rear view of an illustrative removable cushion 60. As shown in FIG. 8, the removable cushion may have one or more incorporated hinge structures 86. The hinge structures 86 may be formed by a highly flexible portion of the cushion member. Alternatively, the foldable portions 86 may be formed by a post that is formed separately from the cushion member. Hinge structures 86 allow for rotation of portions of the cushion member relative to other portions of the cushion member. Each hinge structure 86 may allow for rotation of the cushion member around a respective bend axis 88. The presence of hinge structures 86 may therefore allow for the cushion member to be folded to have a smaller footprint than in the unfolded state, increasing the portability of the cushion member.

In one possible arrangement, each hinge structure 86 may be formed by a post that allows rotation of adjacent cushion portions relative to each other. The post may optionally double as an attachment structure for attaching the removable cushion to the head-mounted support structure. For example, the head-mounted support structure may have a groove and the post (which defines a hinge structure for the cushion) slides into the groove to attach the removable cushion to the head-mounted support structure.

The example of two hinge structures being included in the removable cushion is merely illustrative. In general, any desired number of hinge structures may be included in the removable cushion.

Figure 9:
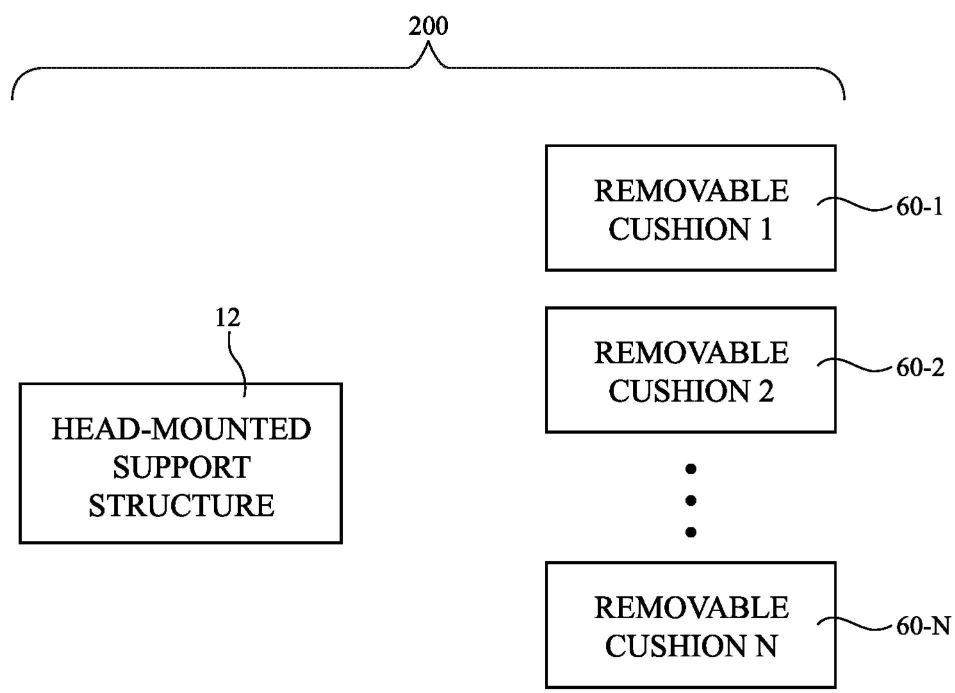
FIG. 9 is a schematic diagram of a system that includes a head-mounted support structure and multiple removable cushions in accordance with an embodiment.

FIG. 9 is a schematic diagram of a system 200 that includes a head-mounted support structure 12 (with optical modules 16L/16R and other associated electronics at its interior) and numerous removable cushions 60. As previously shown and discussed, one of the removable cushions may be attached to the head-mounted support structure to form a head-mounted device 10 with an attached cushion.

System 200 may include any desired number of removable cushions 60-1 through 60-N having different properties. As previously discussed, the varying properties of the removable cushions may include color, thickness, upper-edge height, total height, any other desired dimension, the softness of the material, or any other desired characteristic.

As specific examples, a user may select a removable cushion having a desired color out of many color options. A user may select a removable cushion having a thickness that optimizes the optical properties (e.g., eye relief) of the head-mounted device. A user may select a removable cushion having a desired upper-edge height to maximize their comfort when wearing the head-mounted device.

System 200 may include any desired number removable cushions, each with a unique set of properties. As one example, a user may purchase a head-mounted device and receive the head-mounted support structure and multiple removable cushions having various sizes (e.g., thicknesses and/or total heights). The multiple removable cushions may include a small removable cushion, a medium removable cushion that is larger in at least one dimension than the small removable cushion, and a large removable cushion that is larger than the medium removable cushion in at least one dimension. The user may attach their preferred removable cushion to the head-mounted support structure before using the head-mounted device.

As another example, a user may select their preferred removable cushion (e.g., preferred color, size, etc.) when purchasing a head-mounted device. The user receives their preferred removable cushion in addition to the head-mounted support structure and may attach their preferred removable cushion to the head-mounted support structure before using the head-mounted device. The removable cushion may then repeatedly be removed and washed during the lifetime of the head-mounted device.

In accordance with an embodiment, a head-mounted device is provided that includes a head-mounted support structure including a rigid structure, a flexible structure, and support structures that couple the flexible structure to the rigid structure, the flexible structure at least partially defines a central opening, left and right optical assemblies configured to display images, the left and right optical assemblies are coupled to the head-mounted support structure, and a removable cushion that is configured to be selectively attached to the flexible structure, the removable cushion at least partially surrounds the central opening.

In accordance with another embodiment, the left and right optical assemblies are viewable through the central opening, the head-mounted support structure is covered by a first textile layer, the removable cushion is covered by a second textile layer, the removable cushion has first portions having a first rigidity and second portions having a second rigidity, the removable cushion has recesses and first magnets, at least one of the first magnets is adjacent to each recess, and the head-mounted support structure includes protrusions at the flexible structure that extend away from the rigid structure, each protrusion is configured to mate with a respective recess of the removable cushion when the removable cushion is attached to the flexible structure, and second magnets, at least one of the second magnets is positioned in each protrusion and the first magnets are configured to magnetically couple to the second magnets when the removable cushion is attached to the flexible structure.

In accordance with another embodiment, the left and right optical assemblies are viewable through the central opening.

In accordance with another embodiment, the head-mounted support structure is covered by a textile layer.

In accordance with another embodiment, the support structures are configured to protrude past the flexible structure and through openings in the textile layer.

In accordance with another embodiment, the removable cushion has recesses that are configured to receive the protruding portions of the support structures when the removable cushion is attached to the flexible structure.

In accordance with another embodiment, first magnets are formed in the removable cushion adjacent to the recesses, second magnets are formed in protruding portions of the support structures, and the first magnets are configured to magnetically couple to the second magnets when the removable cushion is attached to the flexible structure.

In accordance with another embodiment, the flexible structure includes a first auxiliary attachment structure between first and second protruding portions, the removable cushion includes a second auxiliary attachment structure between first and second recesses, and the first auxiliary attachment structure is configured to couple to the second auxiliary attachment structure when the removable cushion is attached to the flexible structure.

In accordance with another embodiment, the first and second auxiliary attachment structures include a hook-and-loop fastener.

In accordance with another embodiment, the removable cushion includes a cushion that is covered by a textile layer.

In accordance with another embodiment, first magnets are formed in the removable cushion, second magnets are formed in the head-mounted support structure, and the first magnets are configured to magnetically couple to the second magnets when the removable cushion is attached to the flexible structure.

In accordance with another embodiment, the removable cushion has first portions having a first rigidity and second portions having a second rigidity that is lower than the first rigidity.

In accordance with another embodiment, each one of the first portions is aligned with a respective support structure.

In accordance with another embodiment, the removable cushion includes a hinge structure that allows a first portion of the removable cushion to rotate relative to a second portion of the removable cushion.

In accordance with an embodiment, a head-mounted device is provided that includes a head-mounted support structure including a flexible portion that is configured to conform to a face when the head-mounted support structure is worn, a rigid portion that is separated from the flexible portion by a gap, side portions that bridge the gap between the rigid portion and the flexible portion, and protrusions at the flexible portion that extend away from the rigid portion, and a first set of magnets, each one of the first set of magnets is positioned in a respective one of the protrusions, and a removable cushion that is configured to be selectively attached to the flexible portion, the removable cushion is configured to conform to and directly contact the face when the head-mounted support structure is worn while the removable cushion is attached and the removable cushion includes recesses that are configured to mate with the protrusions of the head-mounted support structure, and a second set of magnets that is configured to magnetically couple to the first set of magnets.

In accordance with another embodiment, the head-mounted support structure is covered by a textile layer and the protrusions extend through openings in the textile layer.

In accordance with another embodiment, the protrusions are formed by the side portions.

In accordance with another embodiment, the head-mounted device includes left and right optical assemblies configured to display images, the left and right optical assemblies are formed in an interior volume of the head-mounted support structure.

In accordance with an embodiment, a system is provided that includes a head-mounted support structure, left and right optical assemblies configured to display images, the left and right optical assemblies are coupled to the head-mounted support structure, and a plurality of removable cushions, each one of the removable cushions is configured to be selectively attached to the head-mounted support structure and each one of the plurality of removable cushions has a property that is unique relative to that property in the remaining removable cushions.

In accordance with another embodiment, the property includes a property selected from the group consisting of a color, a thickness, a cushion material, a total height, and an upper-edge height.

The foregoing is merely illustrative and various modifications can be made to the described embodiments. The foregoing embodiments may be implemented individually or in any combination.

What is claimed is:

1. A head-mounted device, comprising:
- a head-mounted support structure comprising a rigid structure, a flexible structure, and support structures that couple the flexible structure to the rigid structure, wherein the flexible structure at least partially defines a central opening;
- left and right optical assemblies configured to display images, wherein the left and right optical assemblies are coupled to the head-mounted support structure; and
- a removable cushion that is configured to be selectively attached to the flexible structure, wherein the removable cushion at least partially surrounds the central opening, the removable cushion has first portions having a first rigidity and second portions having a second rigidity lower than the first rigidity, and at least one of the second portions is interposed between at least two of the first portions.

2. The head-mounted device defined in claim 1, wherein the left and right optical assemblies are viewable through the central opening, wherein the head-mounted support structure is covered by a first textile layer, wherein the removable cushion is covered by a second textile layer, wherein the removable cushion has recesses and first magnets, wherein at least one of the first magnets is adjacent to each recess, and wherein the head-mounted support structure further comprises:
- protrusions at the flexible structure that extend away from the rigid structure, wherein each protrusion is configured to mate with a respective recess of the removable cushion when the removable cushion is attached to the flexible structure; and
- second magnets, wherein at least one of the second magnets is positioned in each protrusion and wherein the first magnets are configured to magnetically couple to the second magnets when the removable cushion is attached to the flexible structure.

3. The head-mounted device defined in claim 1, wherein the left and right optical assemblies are viewable through the central opening.

4. The head-mounted device defined in claim 1, wherein the head-mounted support structure is covered by a textile layer and wherein the support structures comprise protruding portions configured to protrude past the flexible structure and through openings in the textile layer.

5. The head-mounted device defined in claim 4, wherein the removable cushion has recesses that are configured to receive the protruding portions of the support structures when the removable cushion is attached to the flexible structure.

6. The head-mounted device defined in claim 5, wherein first magnets are formed in the removable cushion adjacent to the recesses, wherein second magnets are formed in protruding portions of the support structures, and wherein the first magnets are configured to magnetically couple to the second magnets when the removable cushion is attached to the flexible structure.

7. The head-mounted device defined in claim 6, wherein the flexible structure includes a first auxiliary attachment structure between first and second protruding portions, wherein the removable cushion includes a second auxiliary attachment structure between first and second recesses, and wherein the first auxiliary attachment structure is configured to couple to the second auxiliary attachment structure when the removable cushion is attached to the flexible structure.

8. The head-mounted device defined in claim 7, wherein the first and second auxiliary attachment structures comprise a hook-and-loop fastener.

9. The head-mounted device defined in claim 1, wherein the removable cushion comprises a cushion that is covered by a textile layer.

10. The head-mounted device defined in claim 1, wherein first magnets are formed in the removable cushion, wherein second magnets are formed in the head-mounted support structure, and wherein the first magnets are configured to magnetically couple to the second magnets when the removable cushion is attached to the flexible structure.

11. The head-mounted device defined in claim 1, wherein each one of the first portions is aligned with a respective support structure.

12. The head-mounted device defined in claim 1, wherein the removable cushion comprises a hinge structure that allows a third portion of the removable cushion to rotate relative to a fourth portion of the removable cushion.

13. The head-mounted device defined in claim 1, wherein the first portions comprise a material and the second portions comprise the material.

14. A head-mounted device, comprising:
- a head-mounted support structure covered by a first textile layer and comprising:
  - a flexible portion that is configured to conform to a face when the head-mounted support structure is worn;
  - a rigid portion that is separated from the flexible portion by a gap;
  - side portions that bridge the gap between the rigid portion and the flexible portion;
  - protrusions at the flexible portion that extend away from the rigid portion; and
  - a first set of magnets, wherein each one of the first set of magnets is positioned in a respective one of the protrusions; and
- a removable cushion that is configured to be selectively attached to the flexible portion, wherein the removable cushion is configured to conform to and directly contact the face when the head-mounted support structure is worn while the removable cushion is attached, the removable cushion is covered by a second textile layer, and the removable cushion comprises:

recesses that are configured to mate with the protrusions of the head-mounted support structure; and a second set of magnets that is configured to magnetically couple to the first set of magnets.

15. The head-mounted device defined in claim 14, wherein the protrusions extend through openings in the first textile layer.

16. The head-mounted device defined in claim 14, wherein the protrusions are formed by the side portions.

17. The head-mounted device defined in claim 14, further comprising:

left and right optical assemblies configured to display images, wherein the left and right optical assemblies are formed in an interior volume of the head-mounted support structure.

18. A system comprising:

a head-mounted support structure;

left and right optical assemblies configured to display images, wherein the left and right optical assemblies are coupled to the head-mounted support structure; and a plurality of removable cushions, wherein each one of the plurality of removable cushions is configured to be selectively attached to the head-mounted support structure, each one of the plurality of removable cushions has a property that is unique relative to that property in the remaining removable cushions, and the property comprises a property selected from the group consisting of: a color, a thickness, a cushion material, a total height, and an upper-edge height.

19. A head-mounted device, comprising:

a head-mounted support structure comprising a rigid structure, a flexible structure, and support structures that couple the flexible structure to the rigid structure, wherein the flexible structure at least partially defines a central opening, the head-mounted support structure is covered by a textile layer, and the support structures comprise protruding portions configured to protrude past the flexible structure and through openings in the textile layer;

left and right optical assemblies configured to display images, wherein the left and right optical assemblies are coupled to the head-mounted support structure; and a removable cushion that is configured to be selectively attached to the flexible structure, wherein the removable cushion at least partially surrounds the central opening.

* * * * *